United States Patent
Wen et al.

(10) Patent No.: US 10,666,482 B2
(45) Date of Patent: May 26, 2020

(54) METHOD AND APPARATUS FOR PAR REDUCTION

(71) Applicant: Telefonaktiebolaget LM Ericsson (publ), Stockholm (SE)

(72) Inventors: Gan Wen, Beijing (CN); Peng Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/476,978

(22) PCT Filed: Jan. 20, 2017

(86) PCT No.: PCT/CN2017/071959
§ 371 (c)(1),
(2) Date: Jul. 10, 2019

(87) PCT Pub. No.: WO2018/133037
PCT Pub. Date: Jul. 26, 2018

(65) Prior Publication Data
US 2019/0356525 A1    Nov. 21, 2019

(51) Int. Cl.
*H04L 27/20* (2006.01)
*H04L 27/26* (2006.01)
(Continued)

(52) U.S. Cl.
CPC ........ *H04L 27/2624* (2013.01); *H04L 5/1469* (2013.01); *H04L 27/08* (2013.01)

(58) Field of Classification Search
CPC ............. H04L 27/2614; H04L 27/2623; H04L 27/2624; H04L 27/2626; H04L 27/08; H04L 5/1469
(Continued)

(56) References Cited

U.S. PATENT DOCUMENTS 6,175,551 B1    1/2001  Awater et al.
6,185,251 B1 *  2/2001  Fertner ............... H04L 25/0202
                                                375/229
(Continued)

FOREIGN PATENT DOCUMENTS

CN      1972263 A     5/2007
CN    101237435 A     8/2008
(Continued)

OTHER PUBLICATIONS

International Search Report and Written Opinion issued in International Application No. PCT/CN2017/071959, dated Oct. 23, 2017 (11 pages).
(Continued)

*Primary Examiner* — Siu M Lee
(74) *Attorney, Agent, or Firm* — Patent Portfolio Builders, PLLC (57) ABSTRACT

Embodiments of the present disclosure provide an apparatus of reducing a peak-to-average ratio of a multi-carrier signal to be transmitted in a wireless communication system. The apparatus comprises a multi-carrier processing circuitry, a storage and a peak cancellation circuitry. The multi-carrier processing circuitry is configured to process a plurality of signals on respective carriers and to combine the processed plurality of signals into a multi-carrier signal to be transmitted. The multi-carrier processing circuitry is further configured to process an injected impulse to obtain an impulse response of the multi-carrier processing circuitry. The storage is configured to store the impulse response as a clipping pulse. The peak cancellation circuitry is configured to apply the clipping pulse to the multi-carrier signal to cancel a peak of the multi-carrier signal whose amplitude is over a predetermined threshold.

18 Claims, 3 Drawing Sheets

(51) Int. Cl.
*H04L 5/14* (2006.01)
*H04L 27/08* (2006.01)

(58) Field of Classification Search
USPC .......................................... 375/295, 299, 297
See application file for complete search history.

(56) References Cited

U.S. PATENT DOCUMENTS

| | | | | |
|---|---|---|---|---|
| 7,362,819 | B2 * | 4/2008 | Obernosterer | H04L 27/2623 |
| | | | | 332/106 |
| 8,259,846 | B2 * | 9/2012 | Liang | H04L 27/2614 |
| | | | | 375/285 |
| 9,337,782 | B1 * | 5/2016 | Mauer | H04B 1/0475 |
| 2004/0240574 | A1 * | 12/2004 | Piirainen | H03G 11/00 |
| | | | | 375/260 |
| 2008/0101502 | A1 | 5/2008 | Navidpour et al. | |
| 2009/0285194 | A1 * | 11/2009 | Kim | H03F 1/3247 |
| | | | | 370/342 |
| 2011/0249768 | A1 * | 10/2011 | Kuwabara | H04B 1/707 |
| | | | | 375/295 |

FOREIGN PATENT DOCUMENTS

| | | |
|---|---|---|
| CN | 101304276 A | 11/2008 |
| CN | 103701748 A | 4/2014 |

OTHER PUBLICATIONS

Xilinx, LogiCore IP Peak Collection Crest Factor Reduction v3.0, DS846, Jun. 22, 2011, (38 pages).

* cited by examiner

METHOD AND APPARATUS FOR PAR REDUCTION

CROSS REFERENCE TO RELATED APPLICATION(S)

This application is a 35 U.S.C. § 371 National Stage of International Patent Application No. PCT/CN2017/071959, filed Jan. 20, 2017, designating the United States.

TECHNICAL FIELD

The non-limiting and example embodiments of the present disclosure generally relate to signal transmission in wireless communication systems, and specifically to a method and an apparatus for reducing a peak-to-average ratio (PAR) of a multi-carrier signal, e.g. an orthogonal frequency division multiplex (OFDM) signal, to be transmitted.

BACKGROUND

This section introduces aspects that may facilitate better understanding of the present disclosure. Accordingly, the statements of this section are to be read in this light and are not to be understood as admissions about what is in the prior art or what is not in the prior art.

Multi-user and multi-carrier signals are more widely used in various communication applications, especially with the development of massive Multiple-Input Multiple-Output (MIMO) technology. Particularly, OFDM signals are widely used in current Long Term Evolution (LTE) wireless communication systems and will also be used in future generation communication systems, like New Radio (NR) systems. An OFDM signal consists of a number of adjacent carriers, closely spaced in frequency, and each modulated with data. OFDM is attractive because of its ability to overcome adverse effects of multi-channel transmission without a need for equalization, while the maximum possible power of an OFDM signal is several times of the average transmitted power. That is, the OFDM signal has a very high PAR. Generally, multi-user and multi-carrier signals often have a high PAR. This places high demands on data converters and especially limits efficiency of operation of power amplifiers (PAs) used in a transmitter, e.g. of a base station. Reducing the PAR is therefore beneficial in increasing PA efficiency by allowing higher average power to be transmitted before saturation occurs.

Currently, Peak Cancellation Crest Factor Reduction (PC-CFR) is commonly used to limit the dynamic range of the signals being transmitted in wireless communications and other applications. The PC-CFR relies on subtracting a pre-calculated clipping pulse from an original signal within the detected peak areas. By utilizing the current carrier configuration of a wireless communication system, the clipping pulse is typically calculated from Sinc functions.

In a K-carrier system (K is the number of carriers used in a wireless communication system), it is supposed that each carrier has been configured with bandwidth $B_1, B_2, \ldots, B_K$, then the clipping pulse calculation starts from sampling of the Sinc function. For carrier i (i=1, 2, ..., K), the sampling process can be represented as:

$$x_i(n) = \frac{\sin(2\pi B_i n T_s)}{2\pi B_i n T_s}, (n = -N, -N+1, \ldots, N) \quad (1)$$

where $T_s$ is the sampling period; n represents the sample number; and N represents a length of the sampled Sinc function, i.e. the total number of samples.

Then the sampled Sinc function will be frequency translated to the configured frequency position of carrier i. Supposing that the center frequencies of the K carriers are $\omega_1, \omega_2, \ldots, \omega_K \in (-\pi, \pi)$, then frequency translated Sinc function for carrier i will be:

$$y_i(n) = e^{jn\omega_i} \frac{\sin(2\pi B_i n T_s)}{2\pi B_i n T_s}, (n = -N, -N+1, \ldots, N) \quad (2)$$

In order to get better performance among carriers with different power spectrum densities, the frequency translated Sinc functions can be weighted and then summed together to generate a final clipping pulse:

$$p(n) = \sum_{i=1}^{K} W_i y_i(n) = \sum_{i=1}^{K} W_i e^{jn\omega_i} \frac{\sin(2\pi B_i n T_s)}{2\pi B_i n T_s}, \quad (3)$$
$$(n = -N, -N+1, \ldots, N)$$

where $W_i$ is a weighting coefficient for carrier i, which meets equation $\sum_{i=1}^{K} W_i = 1$ to make sure the pulse center p(0)=1 so as to simplify the later peak cancellation operation.

Figure 1:
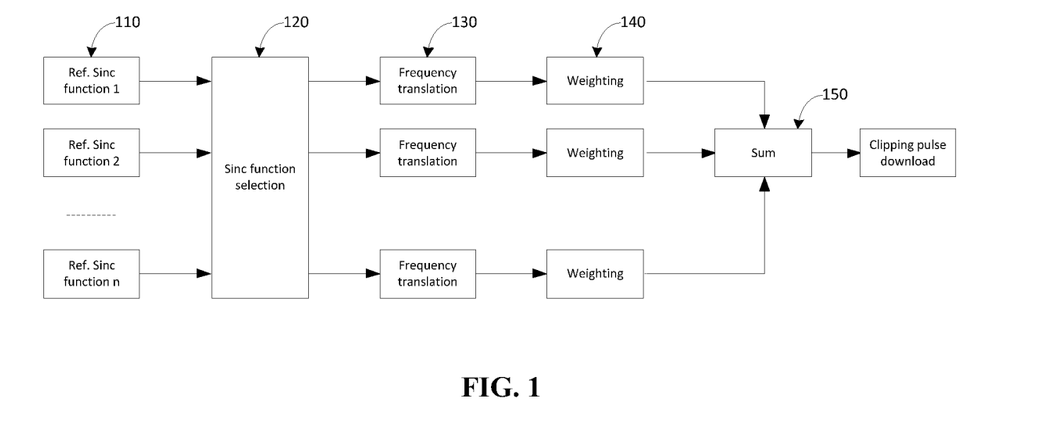
FIG. 1 shows an existing solution to clipping pulse generation for PC-CFR of a multi-carrier signal to be transmitted.

FIG. 1 shows an existing solution to clipping pulse generation for PC-CFR of a multi-carrier signal to be transmitted.

As shown, n reference sampled Sinc functions as shown in equation (1) are pre-stored in a library 110. When a multi-carrier signal is to be transmitted, proper Sinc functions can be selected 120 from the stored Sinc functions during carrier setup according to the carrier configuration. The selected Sinc functions will then be frequency translated 130, weighted 140 and summed 150 according to above equations (2)-(3) to generate the clipping pulse. When the pulse generation is done, the generated clipping pulse can be downloaded to hardware for use in peak cancellation of the multi-carrier signal.

One issue of the existing solution is that large amount of memory is required to store the Sinc functions to provide reasonable accuracy. The issue becomes even worse when narrow-band carriers, like 1.4 MHz LTE carriers, are configured. That is because, if a Sinc function has a bandwidth same as or close to its corresponding carrier, given a fixed sample rate, more samples will be needed for this narrow-band Sinc function.

Another issue of the existing solution is that frequency translation, weighting and Sinc function combination consume lots of computing resources. For example, in order to generate a clipping pulse with length N for a K-carrier signal, 2K*(2N+1) complex multiplication operations are needed for frequency translation and weighting, and (K−1)*(2N+1) complex addition operations are required for Sinc function combination. These computing resources are used just for setup of one antenna branch. For a multiple-antenna and multi-carrier system, e.g. a massive MIMO system, the consumption of computing resources will increase dramatically.

Furthermore, it usually takes long time to download coefficients of the generated clipping pulse to hardware, since typically the processor Input/Output (I/O) speed is not high relative to the amount of the coefficients.

The above issues cause the PC-CFR setup/initialization to take long time. This problem becomes worse or even infeasible when the supported carrier number and antenna number increase a lot, e.g. in a massive MIMO system.

An existing solution of offloading the calculation to hardware, e.g. Application Specific Integrated Circuit (ASIC)/Field Programmable Gate Array (FPGA), can partially solve the above problem, e.g. accelerating the calculation speed. However, the memory for storing the Sinc functions is still needed. Moreover, lots of hardware resources, especially multiplication and addition resources, are consumed and the acceleration hardware can only be activated at setup/initialization of the PC-CFR, so that the utilization ratio of this part of hardware is low.

SUMMARY

Various embodiments of the present disclosure mainly aim at providing an efficient solution to perform peak cancellation for a multi-carrier signal. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided an apparatus of reducing a peak-to-average ratio of a multi-carrier signal to be transmitted in a wireless communication system. The apparatus comprises a multi-carrier processing circuitry, a storage and a peak cancellation circuitry. The multi-carrier processing circuitry is configured to process a plurality of signals on respective carriers and to combine the processed plurality of signals into a multi-carrier signal to be transmitted. The multi-carrier processing circuitry is further configured to process an injected impulse to obtain an impulse response of the multi-carrier processing circuitry. The storage is configured to store the impulse response as a clipping pulse. The peak cancellation circuitry is configured to apply the clipping pulse to the multi-carrier signal to cancel a peak of the multi-carrier signal whose amplitude is over a predetermined threshold.

In an embodiment, the multi-carrier processing circuitry may be configured to process the injected impulse within a first time period, and to process and combine the plurality of signals within a second time period. The peak cancellation circuitry is configured to apply the clipping pulse to the multi-carrier signal within the second time period.

In an embodiment, the multi-carrier processing circuitry may comprise a plurality of carrier processing branches each processing a different one of the plurality of signals on the respective carriers. In this embodiment, the impulse is injected to each of the plurality of carrier processing branches.

In another embodiment, each of the plurality of carrier processing branches comprises a filtering circuit configured to filter the impulse with a preconfigured bandwidth, a delay aligning circuit configured to delay aligning the impulse with a preconfigured delay alignment coefficient, and a frequency translating circuit configured to frequency translate the impulse to a frequency of the corresponding carrier. The multi-carrier processing circuitry comprises an adder configured to sum the impulses processed by the plurality of carrier processing branches to obtain the impulse response.

In another embodiment, each of the plurality of carrier processing branches further comprises a gain adjusting circuit configured to adjust an amplitude of the impulse and a rate converting circuit configured to convert the rate of the impulse with a preconfigured rate converting parameter.

In another embodiment, the preconfigured bandwidth, the preconfigured delay alignment coefficient, and the preconfigured rate converting parameter are configured according to the signal processed by the corresponding carrier processing branch.

In a further embodiment, the amplitude of the impulse is adjusted according to power spectrum densities of the plurality of signals on the respective carriers.

In yet another embodiment, the wireless communication system is a time division duplex system. In this embodiment, if the multi-carrier signal is transmitted in downlink from a base station to a terminal device, the first period is an uplink period for transmission from the terminal device to the base station, while if the multi-carrier signal is transmitted in uplink from the terminal device to the base station, the first period is a downlink period for transmission from the base station to the terminal device.

In yet another embodiment, the wireless communication system is a frequency division duplex system. In this embodiment, the first period is an idle symbol period.

In a second aspect of the present disclosure, there is provided a method of reducing a peak-to-average ratio of a multi-carrier signal to be transmitted in a wireless communication system. The method comprises generating a clipping pulse by injecting an impulse to a multi-carrier processing system for processing a plurality of signals on respective carriers to obtain an impulse response of the multi-carrier processing system, and storing the impulse response as the generated clipping pulse. The method also comprises processing, by the multi-carrier processing system, the plurality of signals on the respective carriers and combining the processed plurality of signals into a multi-carrier signal to be transmitted. The method further comprises applying the generated clipping pulse to the multi-carrier signal to cancel a peak of the multi-carrier signal whose amplitude is over a predetermined threshold.

In an embodiment, the clipping pulse is generated within a first time period and the plurality of signals is processed and combined within a second period. The generated clipping pulse is applied also within the second time period.

In an embodiment, the multi-carrier processing system comprises a plurality of carrier processing branches each processing a different one of the plurality of signals on the respective carriers. In this embodiment, the impulse is injected to each of the plurality of carrier processing branches.

In another embodiment, the clipping pulse is generated by processing the impulse at each of the plurality of carrier processing branches and summing the impulses processed by the plurality of carrier processing branches. Said processing comprises at least filtering the impulse by a filter with a preconfigured bandwidth, delay aligning the impulse with a preconfigured delay alignment coefficient, and frequency translating the impulse to a frequency of the corresponding carrier.

In a further embodiment, the processing of the impulse at each of the plurality of carrier processing branches further comprises adjusting an amplitude of the impulse and converting a rate of the impulse with a preconfigured rate converting parameter.

In yet another embodiment, the preconfigured bandwidth, the preconfigured delay alignment coefficient, and the preconfigured rate converting parameter are configured according to the signal processed by the corresponding carrier processing branch.

In yet another embodiment, the amplitude of the impulse is adjusted according to power spectrum densities of the plurality of signals on the respective carriers.

In yet another embodiment, the wireless communication system is a time division duplex system. In this embodiment, if the multi-carrier signal is transmitted in downlink from a base station to a terminal device, the first period is an uplink period for transmission from the terminal device to the base station, while if the multi-carrier signal is transmitted in uplink from the terminal device to the base station, the first period is a downlink period for transmission from the base station to the terminal device.

In yet another embodiment, the wireless communication system is a frequency division duplex system. In this embodiment, the first period is an idle symbol period.

The above apparatus or method according to various aspects or embodiments of the present disclosure can reuse the already existing circuits in an transmitter of a base station or a terminal device without introducing new circuits or modifying the current circuit configuration of the base station or the terminal device to generate a clipping pulse for peak cancellation. Furthermore, the apparatus and method according to various aspects or embodiments of the present disclosure can be implemented totally in hardware. Thus, the calculation and processing speed can be improved. Moreover, there is no need to store reference functions, e.g. Sinc functions, in advance, and thus memory resources can be saved. In addition, there is no need to download the generated clipping pulse from a processor for calculating the clipping pulse, so no limitation will be imposed by I/O speed of the processor on processing time of peak cancellation.

BRIEF DESCRIPTION OF THE DRAWINGS

The above and other aspects, features, and benefits of various embodiments of the present disclosure will become more fully apparent from the following detailed description with reference to the accompanying drawings, in which like or same reference numerals or letters are used to designate equivalent or same elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment", "an embodiment", "another embodiment" etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "base station" may refer to a node B (NodeB or NB), an evolved NodeB (eNodeB or eNB), a gNB, a Remote Radio Unit (RRU), a radio head (RH), a remote radio head (RRH), a TRP (Transmission Reception Point), AN (access Node), a relay node (RN), or a low power node (LPN) such as a femto, a pico, an access point (AP) and so forth, depending on the applied terminology and technology.

The term "terminal device" refers to any end device having wireless communication capabilities. By way of example and not limitation, a terminal device may be referred to as user equipment (UE), which may be a Subscriber Station (SS), a Portable Subscriber Station, a Mobile Station (MS), or an Access Terminal (AT). The terminal device may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like.

Figure 2:
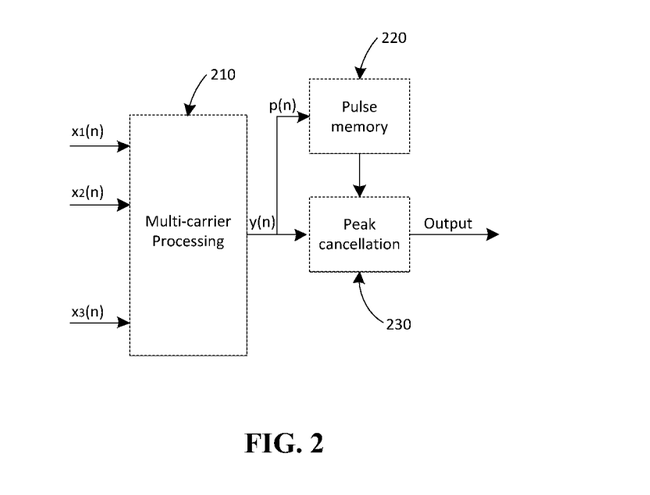
FIG. 2 shows an apparatus of reducing a peak-to-average power ratio of a multi-carrier signal to be transmitted in a wireless communication system according to an embodiment of the present disclosure.

FIG. 2 shows an apparatus 200 of reducing a peak-to-average ratio of a multi-carrier signal, e.g. an OFDM signal, to be transmitted in a wireless communication system according to an embodiment of the present disclosure.

The apparatus 200 comprises a multi-carrier processing circuitry 210, a storage 220, and a peak cancellation circuitry 230.

The multi-carrier processing circuitry 210 is configured to process a plurality of signals to be transmitted, on respective carriers and to combine the processed plurality of signals into a multi-carrier signal to be transmitted. The multi-carrier processing circuitry 210 is further configured to process an injected impulse to obtain an impulse response of the multi-carrier processing circuitry. The storage 220 is configured to store the impulse response as a clipping pulse for later use in peak cancellation. The peak cancellation circuitry 230 is configured to apply the clipping pulse to the multi-carrier signal to cancel a peak of the multi-carrier signal whose amplitude is over a predetermined threshold. The peak cancellation circuitry 230 may be a PC-CFR module. The storage 220 may be a built-in memory of the peak cancellation circuitry 230 or may be a memory device separate from the peak cancellation circuitry 230.

In an embodiment of the present disclosure, the multi-carrier processing circuitry 210 may be configured to process the injected impulse within a first time period and to process the plurality of signals and combine the processed signals within a second time period. The peak cancellation circuitry 230 may be configured to apply the clipping pulse to the multi-carrier signal within the second time period.

As an example, the multi-carrier processing circuitry 210 may work in two modes, which can be referred to as a clipping pulse generation mode and a normal operation mode. The clipping pulse generation mode is only activated at setup/initialization or reconfiguration phase of the peak cancellation circuitry 230, e.g. PC-CFR module. In order not to interrupt the normal operation, it is possible to arrange the clipping pulse generation at "idle" period, for instance, uplink (UL) period in time division duplex (TDD) operation, or idle OFDM symbol in frequency division duplex (FDD) operation. Note that the normal operation mode usually runs after the setup/initialization of the peak cancellation circuitry is done.

Particularly, in a TDD system, if the apparatus 200 is implemented in a base station, when the base station is to transmit a multi-carrier signal to a terminal device in downlink (DL), the multi-carrier processing circuitry 210 may take an uplink (UL) period, during which the base station receives from the terminal device, to generate the clipping pulse. In this case, the first period is the UL period for transmission from the terminal device to the base station.

Likewise, if the apparatus 200 is implemented in a terminal device, when the terminal device is to transmit a multi-carrier signal in UL to a base station, the multi-carrier processing circuitry 210 may take an DL period, during which the terminal device receives from the base station, to generate the clipping pulse. In this case, the first period is the DL period for transmission from the base station to the terminal device.

In a FDD system, the multi-carrier processing circuitry 210 of the apparatus 200 implemented in a transmitter, e.g. of a base station or a terminal device, may take idle symbols, e.g. idle OFDM symbols, to generate the clipping pulse. In this case, the first period is an idle symbol period.

Figure 3:
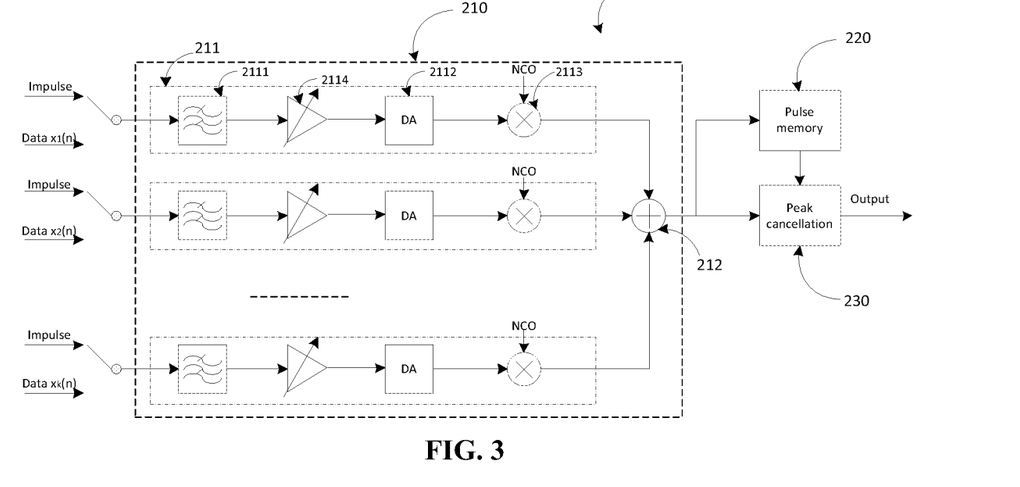
FIG. 3 shows an internal structure of the multi-carrier processing circuitry as shown in FIG. 2 according to an embodiment of the present disclosure.

FIG. 3 shows an internal structure of the multi-carrier processing circuitry 210 according to an embodiment of the present disclosure.

As shown in FIG. 3, the multi-carrier processing circuitry 210 comprises a plurality of carrier processing branches 211 for processing the plurality of signals to be transmitted, on the respective carriers. Each carrier processing branch 211 processes a different one of the plurality of signals on the corresponding carrier. Also, each carrier processing branch receives and processes the injected impulse.

Each carrier processing branch 211 comprises at least a filtering circuit 2111, a delay aligning circuit 2112 and a frequency translating circuit 2113.

Taking the first carrier processing branch as an example, the filtering circuit 2111 is used to filter the signal on the first carrier to shape the signal spectrum and suppress noises. The signals to be processed by different carrier processing branches may have different spectra and bandwidths. Thus, the filtering circuit 2111 in a different carrier processing branch may be configured with a different bandwidth in correspondence to the signal to be processed, which will lead to different filter performance, such as a group delay.

Thus, a delay aligning circuit 2112 usually follows the filtering circuit 2111 so as to eliminate the group delay difference among various branches. Since the plurality of signals to be transmitted may be subject to the filtering circuits with different bandwidths, the group delays caused by the filtering may be different. Thus, the delay aligning circuit 2112 in a different carrier processing branch may be configured with a different delay alignment coefficient.

The frequency translating circuit 2113 is used to translate the frequency of the signal on the corresponding carrier to a configured frequency of that carrier, e.g. a via numerically controlled oscillator (NCO). Since the plurality of signals will be transmitted on different carriers, the frequency translating circuit 2113 in a different carrier processing branch may be configured with a different frequency translating parameter.

In an embodiment of the present disclosure, there is a source to generate an impulse to inject into each carrier processing branch. The filtering circuit 2111, delay aligning circuit 2112, and frequency translating circuit 2113 of each branch 211 can be reused to process the injected impulse.

In this embodiment, the filtering circuit 2111 may be configured to filter the impulse with the bandwidth, which is preconfigured according to the signal processed by the corresponding carrier processing branch as described above.

The delay aligning circuit 2112 may be configured to delay aligning the impulse with the delay alignment coefficient, which is preconfigured according to the signal processed by the corresponding carrier processing branch as described above.

The frequency translating circuit 2113 may be configured to frequency translate the impulse to the configured frequency of the corresponding carrier.

The multi-carrier processing circuitry 210 also comprises an adder 212 configured to combine the impulses processed by the plurality of carrier processing branches to obtain the impulse response of the multi-carrier processing circuitry 210.

In a further embodiment, each of the carrier processing branches may further comprise a gain adjusting circuit 2114.

The gain adjusting circuit 2114 is normally used to adjust signal power on the carriers sharing a same antenna, which is usually set to reflect the carrier power difference across different carrier branches. In this embodiment, the gain adjusting circuit 2114 may also be configured to adjust an amplitude of the impulse, for example according to power spectrum densities of the plurality of signals to be transmitted, on the respective carriers, so that peak clipping can be fairly carried out across the various carriers and the amplitude at the center of the generated clipping pulse can be normalized to one so as to simplify the later peak cancellation operation.

Furthermore, each of the carrier processing branches may optionally comprise a rate converting circuit (not shown in FIG. 2).

The rate converting circuit is normally used to interpolate signal samples on different carrier processing branches to a common rate so as to simplify the following operations. Since the rate converting circuit will not change the frequency spectrum of the signal to be transmitted, its impact will be ignored in the following theoretical analysis.

Without loss of generality, it is supposed that each carrier processing branch has a same sample rate after the rate conversion. Then as shown in FIG. 2, in a K-carrier processing system, the impulse response of carrier branch i can be described as:

$$W'_i h_i(n), (n=0,1, \ldots, 2N) \quad (4)$$

where $W'_i$ is the gain adjustment parameter which is set when the multi-carrier processing circuitry processes the signals to be transmitted, e.g. in the normal operation mode as mentioned above, and $h_i(n)$ is the transfer function of the $i^{th}$ carrier processing branch. The gain adjustment parameter is typically set to reflect carrier power differences across different carrier processing branches.

Correspondingly, the output of the K-carrier processing circuitry with normal I/Q data $x_i(n)$ (i=1, 2, ..., K) input is:

$$y(n) = \sum_{i=1}^{K} (x_i(n) * h_i(n)) W'_i e^{jn\omega_i} \quad (5)$$

where $x_i(n)*h_i(n)$ is the linear convolution between data $x_i(n)$ and $h_i(n)$, and multiplying of $e^{jn\omega_i}$ represents the frequency position of carrier i.

When an impulse is injected into the K-carrier processing circuitry, i.e. let $$x_i(n) = \begin{cases} 1, & n = 0 \\ 0, & n = \text{others} \end{cases} \quad (6)$$

then the impulse response of the whole multi-carrier processing circuitry 210 can be obtained as:

$$p'(n) = \sum_{i=1}^{K} W'_i h_i(n) e^{jn\omega_i} \quad (7)$$

where $W'_i$, the gain adjustment parameter may be newly set according to power spectrum densities of the plurality of signals to be transmitted, on the respective carriers so that peak clipping can be fairly carried out among the various carriers and $W'_i$ may also be adjusted so that the amplitude at the center of the impulse response may be normalized to 1 so as to simplify the later peak cancellation operation. The response of each carrier processing branch is delay aligned, so that the delay aligned output at the center of the total impulse response is 1.

If denoting the new gain setting as $W_i$ (i=1, 2, ..., K), the above impulse response can be represented as:

$$p(n) = \sum_{i=1}^{K} W_i h_i(n) e^{jn\omega_i} \quad (8)$$

The impulse response will then be stored in the storage 220 as the clipping pulse for later peak cancellation.

In order to reduce the peak-to-average ratio of the multi-carrier signal to be transmitted, the signal output, which is denoted as y(n), of the multi-carrier processing circuitry 210 will then be fed to the peak cancellation circuitry 230, e.g. a PC-CFR module.

As discussed above, the peak cancellation circuitry 230, such as PC-CFR, relies on subtracting a proper pulse from the peak areas, i.e. by applying the proper pulse to the multi-carrier signal to cancel a peak of the multi-carrier signal whose amplitude is over a predetermined threshold. According to the embodiments of the present disclosure, the proper pulse is the above generated impulse response p(n) stored as the clipping pulse.

Figure 4:
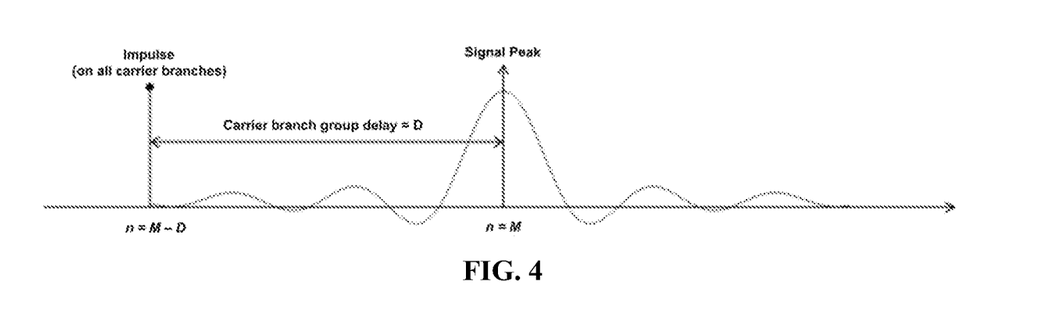
FIG. 4 shows a relationship between a clipping pulse and its impulse stimulus.

FIG. 4 shows a relationship between the clipping pulse and its impulse stimulus.

As shown in FIG. 4, it is supposed that there is a peak at n=M in the normal operation of the peak cancellation circuitry for processing a signal to be transmitted.

The peak cancellation circuitry subtracts the clipping pulse from its input y(n), so that the clipping output of the peak cancellation circuitry will be:

$$y'(n) = y(n) - (|y(M)| - th)\frac{y(M)}{|y(M)|} p(n - M + D) \quad (9)$$

where th is the predetermined clipping threshold and D is the group delay of the corresponding carrier processing branch. Note that after delay alignment, all the carrier branches have the same group delay, even the carriers may have different bandwidths. In the above clipping equation (9), item (|y(M)|−th) represents the signal amplitude of the peak that is to be clipped, and $$\frac{y(M)}{|y(M)|}$$

gives me phase information of that peak.

Since the filtering circuit typically runs at a low frequency and has many taps, it imposes big attenuation on the input out-band noise, which means the frequency spectrum, especially the pass/stop band, is almost identical between the signal before clipping (i.e. y(n)) and after clipping (i.e. y'(n)). Therefore, the apparatus 200 according to the embodiments of the present disclosure can effectively prevent spectrum re-growth by using the carrier processing circuitry to generate the clipping pulse.

Figure 5:
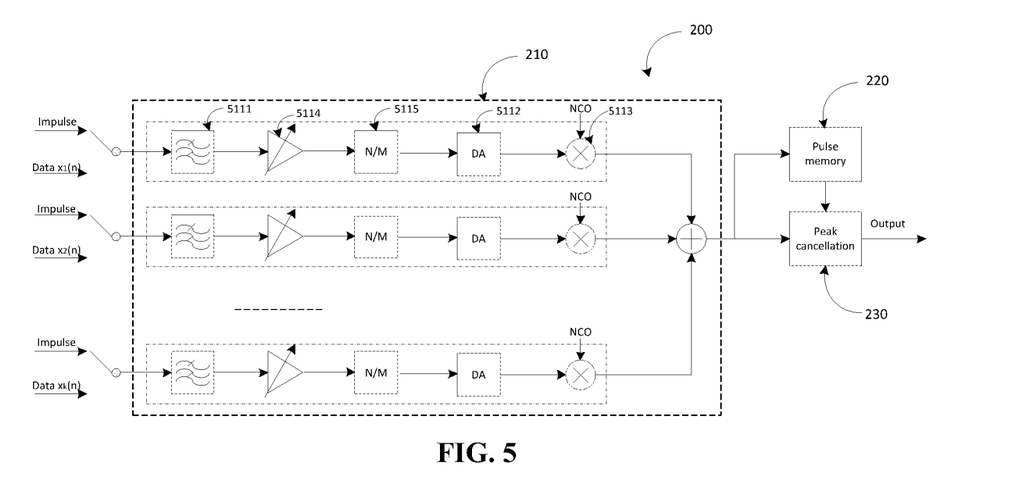
FIG. 5 illustrates a typical example of apparatus of FIG. 2 according to an embodiment of the present disclosure.

FIG. 5 illustrates a typical example of apparatus 200 according to an embodiment of the present disclosure, in which the multi-carrier processing circuitry 210 includes a filtering circuit 5111, a delay aligning circuit 5112, a frequency translating circuit 5113, a gain adjusting circuit 5114, and a rate converting circuit 5115.

In practical implementation, for resource optimization purpose, the circuits 5111-5115 may be arranged in a different order from FIG. 5. For instance, the rate converting circuit 5115 may be arranged before the gain adjusting circuit 5114.

As described above, the circuits 5111-5115 can be shared between processing of the signal to be transmitted and processing of the injected impulse. The multi-carrier processing circuitry 210 may consist of two working modes: clipping pulse generation mode and normal operation mode. The clipping pulse generation mode is only activated at setup/initialization or reconfiguration phase of the peak cancellation circuitry 230, e.g. PC-CFR. In order not to interrupt the normal operation, it is possible to arrange the clipping pulse generation at "idle" period, for instance, the uplink period in TDD operation, or idle OFDM symbol in FDD operation.

In this example, it assumes that before the clipping pulse generation, each carrier processing branch has been properly configured, which includes configuring the filtering circuit with a certain filter bandwidth, configuring the gain adjusting circuit with a certain gain adjusting parameter, configuring the rate converting circuit with a certain rate converting parameter, configuring the delay aligning circuit with a certain delay aligning coefficient and configuring the frequency of the corresponding carrier. All the parameters may have the same values in the clipping pulse generation mode and in the normal operation mode of the multi-carrier processing circuitry, except the gain setting parameter as described above.

On each carrier processing branch, except a normal I/Q data source, there is another source to inject an impulse to all carrier processing branches at the same time. When the pulse generation mode is enabled, the carrier processing branch will switch to this source.

Once the impulse is injected to each carrier processing branch, it will be filtered by the filtering circuit 5111. Since the carrier running on each carrier processing branch may have a different bandwidth, and correspondingly, the filtering circuit 5111 is configured with a different bandwidth, it may lead to different filter performance, such as group delay.

Subsequently, the filtered impulse is adjusted by the gain adjusting circuit 5114. As discussed above, the gain adjusting parameter set when the multi-carrier processing circuitry is in the pulse generation mode is different from the gain adjusting parameter set when the multi-carrier processing circuitry is in the normal operation mode. The setting of the gain adjusting parameters needs to take pulse normalization, weighting (due to different power spectrum densities of respective carrier branches) and group delay into consideration.

The adjusted impulse is then passed to the rate converting circuit 5115. The rate conversion serves two purposes: 1) unifying different sample rates to a common rate across all the carrier processing branches; 2) making a big enough bandwidth headroom for later carrier combination.

The converted impulse is then passed to the delay aligning circuit 5112, which makes the group delays of all the carrier branches to be identical to each other. Due to the delay alignment function, the output from each branch has its center automatically aligned.

Finally, each of the aligned impulses is frequency translated to its desired carrier position and combined to form the final clipping pulse. The clipping pulse will then be written into the storage 220, e.g. a pulse memory. Note that the storage may be built in the peak cancellation circuitry or may be a memory device separate from the peak cancellation circuitry 230.

Figure 6:
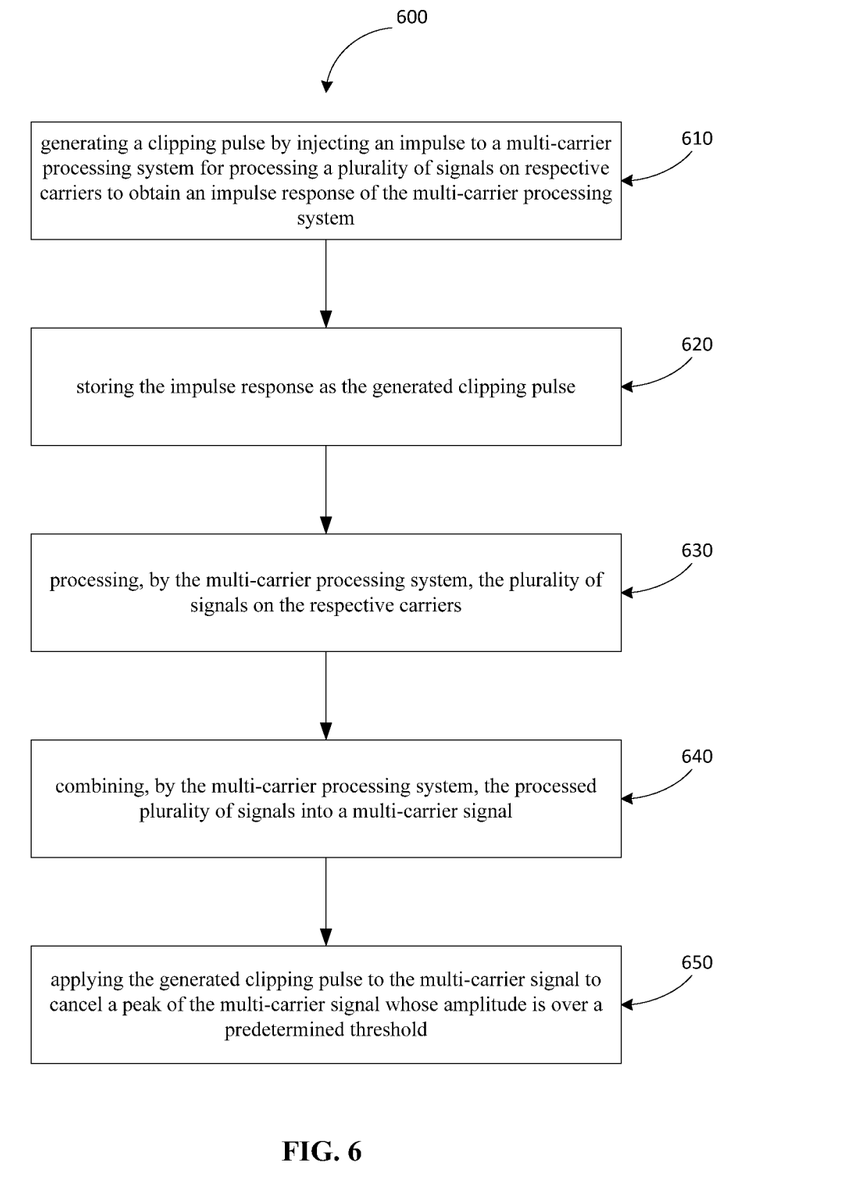
FIG. 6 illustrates a flowchart of a method of reducing a PAR of a multi-carrier signal to be transmitted in a wireless communication system according to an embodiment of the present disclosure.

FIG. 6 illustrates a flowchart of a method 600 of reducing a PAR of a multi-carrier signal to be transmitted in a wireless communication system according to an embodiment of the present disclosure.

As illustrated, the method 600 is entered at block 610 where a clipping pulse is generated by injecting an impulse to a multi-carrier processing system, which may be the multi-carrier processing circuitry 210 as described above, to obtain an impulse response of the multi-carrier processing system. The multi-carrier processing system is used for processing a plurality of signals to be transmitted, on respective carriers.

Then the impulse response is stored as the generated clipping pulse at block 620.

At block 630, the multi-carrier processing system processes the plurality of signals on the respective carriers and combines, at block 640, the processed plurality of signals into a multi-carrier signal to be transmitted.

Then at block 650, the generated clipping pulse is applied to the multi-carrier signal to cancel a peak of the multi-carrier signal whose amplitude is over a predetermined threshold.

In an embodiment, the clipping pulse may be performed within a first time period. The plurality of signals may be processed and combined within a second time period. The peak cancellation may be performed within the second time period.

For example, in a TDD system, if the multi-carrier signal is transmitted in downlink from a base station to a terminal device, the first period is an uplink period for transmission from the terminal device to the base station, while if the multi-carrier signal is transmitted in uplink from the terminal device to the base station, the first period is a downlink period for transmission from the base station to the terminal device.

As another example, in a FDD system, the first period may be an idle symbol period.

In another embodiment, the multi-carrier processing system comprises a plurality of carrier processing branches each processing a different one of the plurality of signals on the respective carriers. In this embodiment, the impulse is injected to each of the plurality of carrier processing branches.

In an embodiment, the clipping pulse is generated by processing the impulse at each of the plurality of carrier processing branches and summing the impulses processed by the plurality of carrier processing branches. The processing comprises filtering the impulse by a filter with a preconfigured bandwidth, delay aligning the impulse with a preconfigured delay alignment coefficient, and frequency translating the impulse to a frequency of the corresponding carrier.

In a further embodiment, the processing of the impulse at each of the plurality of carrier processing branches further comprises adjusting an amplitude of the impulse and converting a rate of the impulse with a preconfigured rate converting parameter.

Preferably, the preconfigured bandwidth, the preconfigured delay alignment coefficient, and the preconfigured rate converting parameter are configured according to the signal processed by the corresponding carrier processing branch.

In another embodiment, the amplitude of the impulse is adjusted according to power spectrum densities of the plurality of signals on the respective carriers.

It shall be appreciated that the operations at blocks 610, 630 and 640 of method 600 correspond to the operations of the multi-carrier processing circuitry 210 of apparatus 200; the operations at block 620 of method 600 correspond to the operations of storage 220; and the operations at block 650 of method 600 correspond to the operations of peak cancellation circuitry 230, which thus will not be repeated herein.

Generally, the transmitter in the existing base station or terminal device has a multi-carrier processing circuitry which has a plurality carrier processing branches each having at least a filtering circuit, a delay aligning circuit and a frequency translating circuit for processing signals to be transmitted, as well as a memory and PC-CFR module. Therefore, the apparatus 200 and method 600 according to embodiments of the present disclosure may reuse the already existing circuits without introducing new circuits or modifying the current circuit configuration of the base station or the terminal device. Furthermore, the apparatus 200 and method 600 according to embodiments of the present disclosure can be implemented totally in hardware. Thus, the calculation and processing speed can be improved. Moreover, there is no need to store the reference functions, e.g. Sinc functions, the memory resources can be saved. In addition, there is no need to download the clipping pulse from the processor for calculating the clipping pulse, so no limitation will be imposed by I/O speed of the processor on processing time of peak cancellation.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. An apparatus for reducing a peak-to-average ratio of a multi-carrier signal to be transmitted in a wireless communication system, the apparatus comprising:
   multi-carrier processing circuitry configured to process a plurality of signals on respective carriers and to combine the processed plurality of signals into the multi-carrier signal to be transmitted, wherein the multi-carrier processing circuitry is further configured to process an injected impulse to obtain an impulse response of the multi-carrier processing circuitry;
   a storage configured to store the impulse response as a clipping pulse; and
   a peak cancellation circuitry configured to apply the clipping pulse to the multi-carrier signal to cancel a peak of the multi-carrier signal whose amplitude is over a predetermined threshold.

2. The apparatus of claim 1, wherein
   the multi-carrier processing circuitry is further configured to:
   process the injected impulse within a first time period;
   process the plurality of signals within a second time period; and
   combine the processed plurality of signals within the second time period, and
   the peak cancellation circuitry is further configured to apply the clipping pulse to the multi-carrier signal within the second time period.

3. The apparatus of claim 1, wherein the multi-carrier processing circuitry comprises a plurality of carrier processing branches each processing a different one of the plurality of signals on the respective carriers, and
   wherein the impulse is injected to each of the plurality of carrier processing branches.

4. The apparatus of claim 3, wherein each of the plurality of carrier processing branches comprises:
   a filtering circuit configured to filter the impulse with a preconfigured bandwidth;
   a delay aligning circuit configured to delay aligning the impulse with a preconfigured delay alignment coefficient; and
   a frequency translating circuit configured to frequency translate the impulse to a frequency of the corresponding carrier, and
   wherein the multi-carrier processing circuitry comprises an adder configured to combine the impulses processed by the plurality of carrier processing branches to obtain the impulse response.

5. The apparatus of claim 4, wherein each of the plurality of carrier processing branches further comprises:
   a gain adjusting circuit configured to adjust an amplitude of the impulse; and
   a rate converting circuit configured to convert a rate of the impulse with a preconfigured rate converting parameter.

6. The apparatus of claim 5, wherein
   the preconfigured bandwidth, the preconfigured delay alignment coefficient, and the preconfigured rate converting parameter are configured according to a signal processed by the corresponding carrier processing branch.

7. The apparatus of claim 5, wherein
   the amplitude of the impulse is adjusted according to power spectrum densities of the plurality of signals on the respective carriers.

8. The apparatus of claim 2, wherein
   the wireless communication system is a time division duplex system,
   if the multi-carrier signal is transmitted in downlink from a base station to a terminal device, the first time period is an uplink period for transmission from the terminal device to the base station, and
   if the multi-carrier signal is transmitted in uplink from the terminal device to the base station, the first time period is a downlink period for transmission from the base station to the terminal device.

9. The apparatus of claim 2, wherein
   the wireless communication system is a frequency division duplex system, and
   the first time period is an idle symbol period.

10. A method of reducing a peak-to-average ratio of a multi-carrier signal to be transmitted in a wireless communication system, the method comprising:
    generating a clipping pulse by injecting an impulse to a multi-carrier processing system for processing a plurality of signals on respective carriers to obtain an impulse response of the multi-carrier processing system;
    storing the impulse response as the generated clipping pulse;
    processing, by the multi-carrier processing system, the plurality of signals on the respective carriers;
    combining, by the multi-carrier processing system, the processed plurality of signals into the multi-carrier signal to be transmitted; and
    applying the generated clipping pulse to the multi-carrier signal to cancel a peak of the multi-carrier signal whose amplitude is over a predetermined threshold.

11. The method of claim 10, wherein:
    generating the clipping pulse is performed within a first time period; and processing the plurality of signals, combining the processed plurality of signals, and applying the generated clipping pulse are performed within a second time period.

12. The method of claim 10, wherein the multi-carrier processing system comprises a plurality of carrier processing branches, each processing a different one of the plurality of signals on the respective carriers, and wherein injecting the impulse comprises injecting the impulse to each of the plurality of carrier processing branches.

13. The method of claim 12, wherein generating the clipping pulse comprises:

processing the impulse at each of the plurality of carrier processing branches by at least:
filtering the impulse by a filter with a preconfigured bandwidth,
delay aligning the impulse with a preconfigured delay alignment coefficient, and
frequency translating the impulse to a frequency of the corresponding carrier; and
combining the impulses processed by the plurality of carrier processing branches.

14. The method of claim 13, wherein processing the impulse at each of the plurality of carrier processing branches further comprises:
adjusting an amplitude of the impulse; and
converting a rate of the impulse with a preconfigured rate converting parameter.

15. The method of claim 14, wherein
the preconfigured bandwidth, the preconfigured delay alignment coefficient, and the preconfigured rate converting parameter are configured according to a signal processed by the corresponding carrier processing branch.

16. The method of claim 14, wherein
the amplitude of the impulse is adjusted according to power spectrum densities of the plurality of signals on the respective carriers.

17. The method of claim 11, wherein;
the wireless communication system is a time division duplex system,
if the multi-carrier signal is transmitted in downlink from a base station to a terminal device, the first time period is an uplink period for transmission from the terminal device to the base station, and
if the multi-carrier signal is transmitted in uplink from the terminal device to the base station, the first time period is a downlink period for transmission from the base station to the terminal device.

18. The method of claim 11, wherein:
the wireless communication system is a frequency division duplex system, and
the first time period is an idle symbol period.

* * * * *